(12) United States Patent
Runge et al.

(10) Patent No.: US 9,183,833 B2
(45) Date of Patent: Nov. 10, 2015

(54) METHOD AND SYSTEM FOR ADAPTING INTERACTIONS

(75) Inventors: Fred Runge, Wuensdorf (DE); Wiebke Johannsen, Berlin (DE); Frank Oberle, Berlin (DE); Markus Van Ballegooy, Bonn (DE); Felix Burkhardt, Berlin (DE); Joachim Stegmann, Darmstadt (DE); Martin Eckert, Berlin (DE); Roman Englert, Swisttal (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1896 days.

(21) Appl. No.: 11/943,878

(22) Filed: Nov. 21, 2007

(65) Prior Publication Data

US 2008/0155472 A1 Jun. 26, 2008

(30) Foreign Application Priority Data

Nov. 22, 2006 (DE) .......................... 10 2006 055 864

(51) Int. Cl.
*G06F 3/048* (2013.01)
*G10L 15/22* (2006.01)
*G06F 17/27* (2006.01)

(52) U.S. Cl.
CPC .............. *G10L 15/22* (2013.01); *G06F 17/279* (2013.01)

(58) Field of Classification Search
CPC ......... G06F 9/4446; G06F 3/16; G06F 3/167; G06F 3/0481; G06F 3/0482
USPC ......... 715/705, 707, 708, 727, 728, 764, 765, 715/781, 788, 789, 810, 811, 978
See application file for complete search history.

(56) References Cited

U.S. PATENT DOCUMENTS

| | | | |
|---|---|---|---|
| 5,493,608 A | 2/1996 | O'Sullivan | |
| 5,911,143 A | 6/1999 | Deinhart et al. | |
| 6,665,644 B1 * | 12/2003 | Kanevsky et al. | 704/275 |
| 6,721,706 B1 * | 4/2004 | Strubbe et al. | 704/275 |
| 2003/0110038 A1 * | 6/2003 | Sharma et al. | 704/270 |
| 2005/0044508 A1 * | 2/2005 | Stockton | 715/811 |
| 2006/0184800 A1 * | 8/2006 | Rosenberg | 713/186 |
| 2006/0218506 A1 * | 9/2006 | Srenger et al. | 715/810 |
| 2007/0234209 A1 * | 10/2007 | Williams | 715/700 |

FOREIGN PATENT DOCUMENTS

| | | |
|---|---|---|
| EP | 0697662 | 2/1996 |
| EP | 1102241 | 5/2001 |
| EP | 1107229 | 6/2001 |

OTHER PUBLICATIONS

Kazunori Komatani et al., "User Modeling in Spoken Dialogue Systems for Flexible Guidance Generation", Proceedings of EUROSPEECH 2003, Geneva, pp. 745-748.

(Continued)

*Primary Examiner* — Rashawn Tillery
(74) *Attorney, Agent, or Firm* — Leydig, Voit & Mayer, Ltd.

(57) ABSTRACT

A method and system for adapting automated interactions that allows the interactive behavior of an automated system, or the nature of the interaction elements implemented thereon, to be adapted to properties and/or behaviors of users of such systems in order to enhance operating convenience. Interaction adaptation is performed with reference to user groups to which the users are allocated.

24 Claims, 7 Drawing Sheets

(56) References Cited

OTHER PUBLICATIONS

Anna Hjalmarsson, "Adaptive Spoken Dialogue Systems", Centre of Speech Technology, KTH, Jan. 2005, pp. 1-12.

Andreas Harrer et al., "Creating cognitive tutors for collaborative learning: steps toward realization", Springer Science+Business Media B.V. 2006, Aug. 18, 2006, pp. 175-209.

Hartwig Holzapfel et al., "Integrating Emotional Cues into a Framework for Dialogue Management", Proceedings of the Fourth IEEE International Conference on Multimodal Interfaces (ICMI'02), (6 pages).

\* cited by examiner

METHOD AND SYSTEM FOR ADAPTING INTERACTIONS

Priority is claimed to German Patent Application No. 10 2006 055 864.2, filed Nov. 22, 2006, which is incorporated by reference herein.

The present invention generally relates to a method for adapting automated interactions. More specifically, the present invention relates to a method that allows the interactive behavior of automated systems, or the nature of the interaction elements implemented thereon, to be adapted to properties and/or behaviors of the users of such systems in order to enhance operating convenience. The invention further relates to an interaction system embodied to carry out the method.

BACKGROUND

Operation of automatic machines occurs, at least, when the operator or user of an automatic machine uses the machine to perform more complex tasks, in many cases based on an interaction conducted between the user and the machine. One example to be considered here is automatic ticket machines that allow the sale of tickets not only for a few specific routes but also for a larger network, for example a national rail system, in consideration of a wide variety of boundary conditions. The user is interactively instructed by the automatic machine to indicate the starting point of his/her journey, the destination, and the desired departure or arrival time, and if applicable to provide further information such as, for example, a preferred seat location, smoking/non-smoking and the like. For this purpose, the machine prompts him/her, for example, by way of a visual display, acoustically, or in audiovisual form. Depending on the configuration of the system, the user inputs the corresponding information by individual buttons, a keypad, other manual control elements, or in spoken form. Modern systems embodied as speech interaction systems are even capable of extracting, from the user's complete sentences, specific data such as departure location or destination. Many systems in which the request to the user to input appropriate information is made in spoken form have the additional capability for interrupting the speech commands (so-called speech prompts) outputted by the system, thus shortening the interaction time.

It is apparent from practical use, however, that users of such interaction systems have very different inhibition thresholds when dealing with automatic machines, and in some cases behave very differently when interacting with the machine. Users can be very roughly divided, for example, into experienced and inexperienced users. Whereas the experienced user deals with a particular interaction system in a practiced and confident manner, and his/her priority is to achieve the purpose of the interaction (i.e. having his/her requests fulfilled) as quickly as possible, for the inexperienced user a gentler interaction that never makes him/her uncertain may be more important. A much greater differentiation between users also exists, depending on the complexity of the system and the tasks to be performed by it, in terms of the personal requirements associated with users and in terms of the users' behavior. It is desirable in this context for automated interaction system to be made as flexible as possible.

Solutions have therefore already been proposed in which the execution of an interaction conducted between the user and the automatic machine or interaction system is adapted to user characteristics and/or to user behavior. Such solutions are often aimed at a direct or immediate adaptation of the interaction to a particular user who is operating the machine. U.S. Pat. No. 5,493,608, for example, describes a solution in which the response speed of speech prompts of an interaction system is adapted to the speed at which the particular user is speaking.

It has also been described, however, not to adjust the interactive behavior of an automated interaction system to the individual user, but rather to adapt it to a group of users, the individual user then being allocated to one of the groups known to the system. A corresponding approach is described, for example, in Komatani, K., et al. in "User Modeling in Spoken Dialogue Systems for Flexible Guidance Generation," Proceedings of EUROSPEECH 2003, GENEVA. According to the aforesaid document, users are allocated to various classes on the basis of their behavior, and the speech interaction is adapted in accordance with the class allocated to a user. Both the nature of the classes (in the document, a subdivision into the classes of experienced users, inexperienced users, and rush users is made) and the adaptation performed in terms of the different classes are, however, absolutely rigid. In other words, there is one fixed interaction path for experienced users, another for inexperienced users, and lastly a further, but still static, interaction path for rush users. The corresponding allocation to user classes, and their linkage to the individual interaction paths, is predefined by the developer of the interaction or the system.

If the interaction is adapted using Bayes networks, as is done inter alia in Hjalmarsson, A., "Adaptive Spoken Dialogue Systems," Centre of Speech Technology, KTH, January 2005, then application of the corresponding underlying statistical procedures and methods requires an enormous calculation effort that often also slows down the execution time of such interactions. In such methods, the interactions and their structures are differentiated by so-called network graphs whose edges, as described in European Patent No. 1 102 241 A1, have transition probabilities from one interaction state to another allocated to them.

Group-based or user-class-based information systems that manage access to information with reference to class have furthermore been described. One example of these is permissions management, known from computer systems and networks, in which the rights of the individual users participating in the system to access portions of the system are controlled and managed. A corresponding solution is described, for example, in German Patent No. 694 273 47 T2. Additionally known in this context are solutions for managing user classes.

Also previously described are speech recognition systems that, from the speech inputs of a user, can determine the language he/she is speaking but can also, for example, draw conclusions as to age or gender. With the aid of emotion detectors associated with speech recognition systems, statements can even be made regarding the user's emotional states such as anger, impatience, or frustration.

SUMMARY

It is an aspect of the present invention to provide a method that enables flexible adaptation of automated interactions to user groups of corresponding interaction systems, without degrading system performance. A further aspect of the present invention is an interaction system suitable for carrying out such a method.

In an embodiment, the present invention provides a method for adapting interactions conducted between interaction systems and users of the interaction systems to the users. The invention includes a step of defining a nature of a respective automated interaction by interaction states in the form of messages and prompts, by the configuration of the messages and prompts, by menu options and by state transitions. The nature of the interaction is adapted, during its execution, to the user in a manner that is determined by a user class that is allocated to the user conducting the interaction according to rules stored and implemented in the interaction system on the basis of properties communicated by the user during the interaction or automatically ascertained by the interaction system or the user's behavior, or on the basis of the user's identification by the system and information previously acquired with regard to the user's identity. The manner in which the nature of the interaction is adapted to the user of a user class is modifiable. Also, the user-class-specific utilization counters for selected state transitions of a system-side part of the interaction are operated in the interaction system and are incremented or decremented upon passage through respective state transitions during processing of the interaction and when a respective counter, a group of counters or a variable derived from the counters, exceeds or falls short of an established limit value established. An adaptation process is started with which the nature of the system-side part of the interaction is modified in user-class-related fashion so that proceeding from an initial nature existing upon its implementation in the system, the system-side part of the interaction is repeatedly adapted in user-class-selective fashion to the needs of the members of the respective user class.

BRIEF DESCRIPTION OF THE DRAWINGS

Aspects of the present invention will be described by way of exemplary embodiments with reference to the following drawings, in which:

FIG. 1b is a diagram showing a higher-resolution depiction of state 3 of the interaction model according to FIG. 1a;

FIG. 2b is a diagram showing a higher-resolution depiction of state 3 of the modified or adapted interaction model according to FIG. 2a;

FIG. 3b is a schematic depiction of a possible structure for class-specific data held in the user-class manager of the system according to FIG. 3a;

DETAILED DESCRIPTION

Figure 1A:
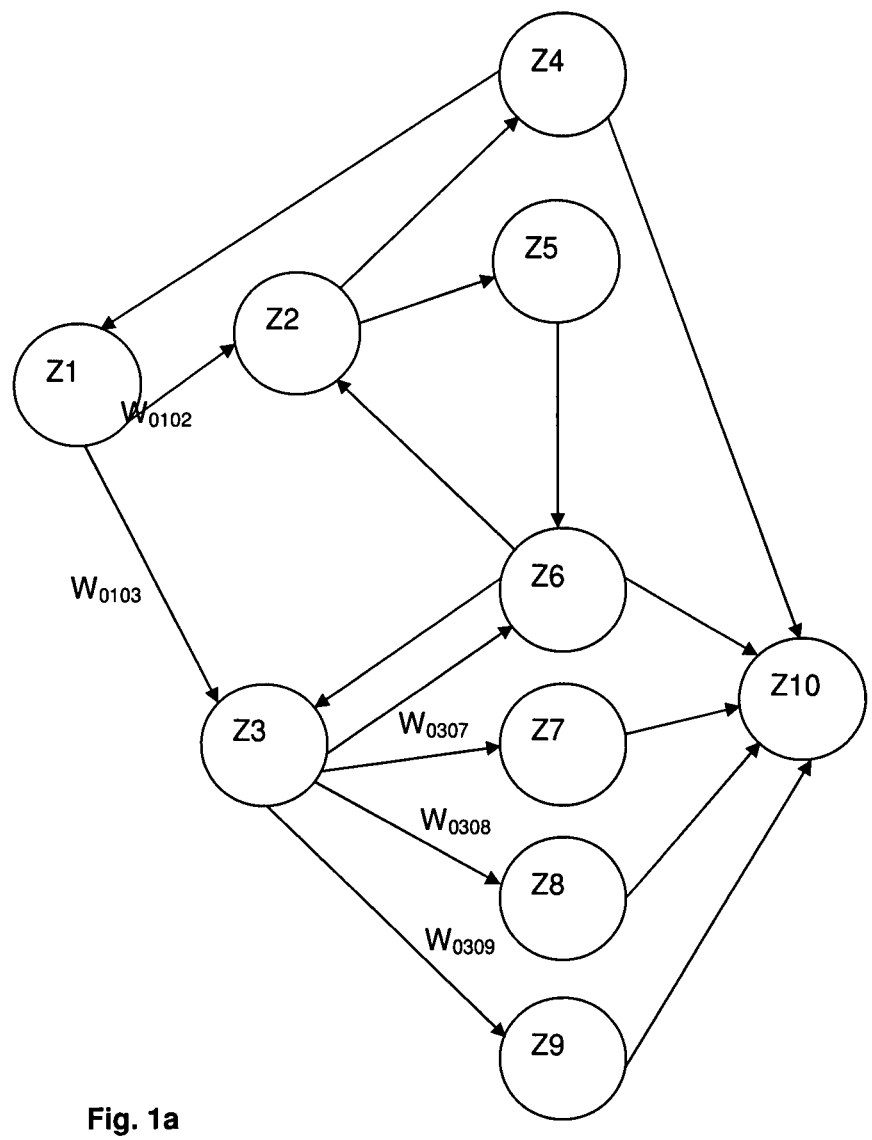
FIG. 1a is a diagram showing an example of an interaction model according to an example embodiment of the present invention.

The method according to an embodiment of the present invention serves to adapt the nature of interactions conducted between automated interaction systems and their users to properties and/or types of behavior of the users. The "nature" of an interaction is understood here to be its mode of appearance, which is determined by interaction states in the form of messages and prompts, by state transitions and their logical sequence (e.g. menu width and depth), and by the configuration of messages and prompts perceivable by the user. This nature of an interaction is adapted as it is conducted, in a manner that is determined by a user class to which the particular user conducting the interaction is allocated in accordance with rules stored and implemented in the pertinent interaction system. Allocation of the user to the user class takes place on the basis of properties and/or behaviors of the user communicated by him/her or automatically ascertained by the interaction system, for example by speech recognition and/or emotion recognition components, and/or such allocation is made on the basis of identification of the user by the system and information previously allocated to his/her identity.

According to an embodiment of the present invention, however, the manner in which the interaction is adapted to the user on the basis of his/her membership of a user class is modifiable. This means that the interaction is adapted to a user who, for example, is allocated to a user class 2 or B within a system managing ten user classes, in correspondingly instantaneous fashion for the parameters existing for class 2 or B, but the manner of that adaptation can be entirely different at a later point in time at which the user once again interacts with the system, even if the user is once again allocated by the system to user class 2 or B during the interaction conducted at the later point in time. The manner in which an automated interaction system working in accordance with the method adjusts itself to the users that are to be allocated to a user class is therefore, unlike in the existing art, not rigid.

This is brought about by the fact that user-class-specific utilization counters are operated in the interaction system for selected state transitions of the system-side part of the interaction. These user-class-specific utilization counters are incremented or decremented during interaction processing at each passage through a relevant state transition. Each time a respective counter, a group of counters, or a variable derived from the counters exceeds or falls short of a limit value established for them, an adaptation process is then started with which the nature of the system-side part of the interaction is modified in user-class-related fashion. In the context of the statements above, for example, a decrementing of counters is relevant if the respective counter is counted down, upon passage through the associated state transition, from a starting value to zero or to a predefined lower value.

The system-side part of the interaction is therefore, starting from an initial nature stipulated when it is implemented in the system, repeatedly adapted in class-selective fashion to the needs of the members of the particular user classes. The corresponding adaptation—i.e. for example the modification of the sequence of message or prompts, or their content, or their external appearance—can be performed by preference automatically, but also, if necessary or in individual cases, by administrative intervention based on a transmission of corresponding information calling attention to the need for a modification. The value for a counter falls below a limit value, for example, if it has not risen by incrementation to a predefined value within a defined interval in accordance with the rules stored in the system, i.e. for example has not passed through a state transition within a specific time interval or executed a specific number of interactive actions at a frequency stipulated for it, or if, as already stated, the counter is decremented, starting from an initial value, at each passage through the state transition associated with it. It is a matter of the design of the interaction system and/or its rules as to whether a counter, a counter group, or a derived variable is reset once a class-specific adaptation of the interaction has occurred or whether, for example, a new limit value is defined for the counter, counter group, or derived variable with regard to a possible further later adaptation of the interaction.

An advantage of the method according to an embodiment of the present invention is that during the execution of the interaction, the system needs to adapt its nature to the user only in terms of the class ascertained for the user, while the manner in which that adaptation takes place is, independently thereof, automatically modified at certain time intervals.

The latter preferably occurs, to the extent possible, in the background. The time interval at which the adaptation (proceeding, by preference, in the background) takes place is determined by the limit values defined for the aforesaid utilization counters or groups of utilization counters, or from the variables derived from the utilization counters. The underlying principle of operating user-class-related counters for the state transitions and defining limit values for these counters or counter groups or variables derived therefrom yields the further advantage that the manner in which execution of the interaction is adapted for the users of a user class is not modified until the data collected for a user class or for a state transition can be regarded as statistically sufficient. The statistical basis on which the collected data can be regarded as sufficient is determined, for a respective state transition, by way of the limit value defined for its counter allocated to it, or a variable derived therefrom.

As is evident from the statements above, a variety of criteria are possible for the allocation of a user of the interaction system to the user classes contained in the system. One might mention in this context, for example, the language or nationality of a user, his/her gender, and/or his/her age, but if applicable also his/her emotional state during execution of the interaction. Also relevant, however, are criteria based on his/her social or technical environment, or even personal preferences or interests. These might involve, for example, the user's place of residence or current location, but also the matter of whether the user is equipped with a DSL connection and whether further data about him/her are available based on registration with an access provider. With regard to the aforementioned preferences and interests, one criterion might be regarded as the user's presumable purpose in the interaction, so that, for example, a user having known preferences is first offered very specific titles for download from an Internet music portal. The known or ascertained properties and/or behaviors of a user can also be combined, in the course of user classification, i.e. allocation of the user to user classes of the system, with time-related, local, or technical parameters such as, for example, connection quality, bandwidth, interference noise type and/or level, terminal characteristics, communication costs, location coordinates (and/or identifiers of persons or objects in the vicinity), weather conditions, interaction history, and similar contextual parameters. To cite an example, it might be possible temporarily to introduce a user class "male at Christmas time," or user classes of the form "child with area code XYZ" or "female with GPS data for city B."

Depending on the criteria used for the allocation to user classes, the information necessary therefore can be acquired, as already stated, automatically by the interaction system, preferably without conscious effort by the user, or obtained from data that were collected earlier with regard to the relevant user. The latter requires, however, that the user be identified in the context of performance of the interaction; this once again can also be done automatically or by way of direct user inputs. With regard to automatic user identification, reference may be made here merely to the possibility of utilizing biometric data, subscriber identification (e.g. calling line identity (CLI), home location register (HLR), IP address, or the like), or explicit user inputs as to identity. Further statements will be made later with regard to other possibilities for automatic collection of data that enable allocation of the user to user classes.

The nature of the interaction is adapted online, i.e. during its execution, in accordance with the user class allocated to the user in that context. Repeated user-class-selective adaptation of the manner of this online adaptation can, however, occur online or offline. An offline adaptation will occur, for example, preferably in the context of interactive automatic machines with which only one user ever communicates simultaneously. Adaptation of the manner of the user-class-dependent online adaptation, occurring during use, of the interaction to the particular user occurs during time periods in which no interaction is currently being performed with the interaction system. On the other hand, if complex interaction systems always communicate simultaneously with a plurality of users, and if counter values therefore change quickly, an online adaptation is preferable. It is conceivable in this context that, because counters, counter groups, or derived variables exceed or fall below corresponding limit values, an interaction conducted by a user initiates, later on in the interaction, a procedure with which the manner in which the interaction to users of the class to which that user is presently allocated is modified in the background, but the interaction still addresses that particular user in accordance with the "old" interaction nature provided for that user class.

While the user of an interaction system operating according to the method is always unequivocally allocated to one user class in terms of execution of an interaction that he/she is presently conducting, according to a preferred embodiment of the method he/she can if applicable, for the purpose of repeated modification on the manner in which the interaction is adapted during execution to persons of a user class, be allocated simultaneously to multiple user classes. With reference to the criteria previously addressed, a user can therefore, for the user-class-specific interaction adaptation that preferably occurs repeatedly in the background at time intervals, be allocated e.g. to a user class of "male users" but also simultaneously to a user class of "older users." User classes can also be formed in the interaction system by combining other user classes, the latter optionally continuing to be managed independently by the interaction system. With regard to the latter example, it is therefore conceivable for the interaction system to be simultaneously operating a user class of "male users," a user class of "older users," and a user class of "older male users," such that in terms of the counters allocated to the selected state transitions, a separate counter is managed for the relevant state transitions for each of the three aforesaid user classes.

As already indicated, the user is always allocated to only one user class in terms of execution of the interaction in which he is presently engaged. There are once again several possible answers to the question of how this allocation is performed. It is conceivable, for example, for the user to be treated, throughout execution of the interaction, as a member of the user class to which he/she can initially be allocated. It is also conceivable, however, for him/her to be allocated to the user class with respect to which he/she corresponds to most of the criteria applied in order to form the user classes. Referring again to the aforesaid example, this means that what is first recognized, for example, is that the user beginning an interaction is a male user, and this user is therefore allocated to the user class of "male users." It is also possible, however, for the system to detect that the relevant user corresponds both to the "male" criterion and to the "older user" criterion, and the user is consequently allocated to the "older male users" user class. Furthermore, however, it can also be provided that the user is always allocated to one class in terms of execution of the interaction in which he is presently engaged, but is nevertheless allocated to varying user classes in the course of the interaction. Using the example already repeatedly adduced, it is therefore conceivable that the user is allocated at the beginning of the interaction to the broader class of "male users," but is also recognized in the course of the interaction—especially if further data about him are automatically acquired—as an older user, and is allocated (in a shift from the original user class) to the user class of "older male users." This can be useful in particular when the principle is to stipulate an initially broadly designed (i.e. largely user-class-independent) interaction path, and for increasing differentiation of the nature of the interaction to occur only as the interaction branches further, that differentiation then taking place in class-specific or class-selective fashion. Even if the user is optionally allocated to varying user classes in the course of the interaction, in accordance with the statements made above, he/she is nevertheless always allocated to only one user class at a time in terms of execution of the interaction. With regard to the class-specific interaction adaptation occurring repeatedly at time intervals, however, he/she can, as already discussed, be allocated simultaneously to multiple user classes.

The present invention also encompasses embodiments of the method in which new user classes are formed, as required, by an interaction system embodied for that purpose according to rules stored therein. This can also be accomplished, for example, by way of the aforementioned grouping of user classes.

According to an embodiment of the method according to the present invention, however, an interaction can be already be diversified upon its implementation. For example, the interaction can, upon its implementation, exhibit multiple user-class-specific initial natures. This means that upon its implementation, the interaction is already stored in such a way that, regardless of subsequent user-class-specific adaptations, it appears differently to various user classes from the start.

Further specific embodiments of the method according to the present invention refer to interaction systems in which the interaction is embodied, at least in terms of the user-side part of the interaction, at least partly as a speech interaction. But both the user-side part of the interaction and the system-side part of the interaction can, of course, also be embodied partly or even entirely as a speech interaction. For interaction systems of this kind, possibilities for automatically allocating a user to user classes result from allocating the user to the user classes according to rules stored in the interaction system, by evaluating data from an arrangement for language identification, an arrangement for speech recognition, or an arrangement for speaker classification. According to a corresponding embodiment, the allocation of the user to user classes can be accomplished, for example, in consideration of the language spoken by the user as ascertained by the arrangement for language identification. Corresponding language identification systems that are capable of this already known. Also known, as already indicated above, are speech recognition systems that allow the meaning of the words spoken by a person conducting a speech interaction to be ascertained. The possibility thus of course also exists, in the context of the use of such systems, of performing the user-class-dependent interaction adaptation, and/or the adaptation of the manner of that adaptation, based on the thought content or meaning of the words spoken by a user in a speech interaction.

If the arrangement for speaker classification, or a speaker classification system integrated into the interaction system or coacting therewith, possess a suitable dictionary or a suitable grammar, it is also conceivable to perform the class allocation in consideration of an accent, dialect, or sociolect spoken by the user and identified on the basis of the speaker classification. Also known is the possibility of drawing conclusions from the user's speech, by speaker classification systems, as to his/her age or gender. Provision is accordingly made, according to further embodiments of the method according to the present invention, to perform the class allocation on the basis of the age and/or gender of the user determined by a speech analysis.

Also relevant from the standpoint of automatic acquisition of data for the purpose of allocating a user to one or more user classes is the evaluation of the data arrangement for emotion detection that belongs to the interaction system or are linked to it, on the basis of rules stored in the interaction system.

According to a preferred refinement of the variant method based on automatic acquisition of data for user classification, confidence values that represent an indication of the reliability of the acquired data are taken into account in the allocation of user classes. The procedure is preferably also configured in such a way that a rank order is allocated to multiple criteria that are relevant to the allocation of a user to a user class. Data for a user identified by a system that were acquired earlier or are held in a database thus possibly receive priority over data that, for example, are automatically acquired by the system, using a speech recognition system, at the moment the interaction is executed. It is, for example, conceivable in this context that a user is classified by the system as a "young user" on the basis of evaluation of the speech-recognition data, while at the same time, based on the fact that his identity can be ascertained and that data about him are stored in a database accessible to the system, he is identified as a 60-year-old user. In such a case, in accordance with rules stored in the interaction system, the classification resulting from the database data is given priority. With regard to the previously mentioned confidence values, however, it is also conceivable that in the case just discussed, priority is given to the automatically acquired data, specifically when a very high confidence is identified for them and it must be assumed, based on the system rules, that the corresponding database entry referring to age is not correct. The latter consideration preferably applies in particular when the data contained in the database are data acquired by third parties, i.e. data that were acquired by a different company other than the one administering the interaction system (and, if applicable, also by an automated method), so that a certain uncertainty applies to these data in the system.

In view of the fact that in accordance with an embodiment of the method according to the present invention, provision is made for operating counters for a plurality of state transitions of a possibly extensive and complex interaction, a further advantageous embodiment of the invention provides for allocating a weighting to the individual counters. If the limit value for a counter or for a variable allocated thereto is then exceeded, this means that the adaptation (occurring thereafter in the background) of the nature of the system-side part of the interaction is not necessary carried out on a priority basis based on the counter whose limit value was exceeded, but instead that, if applicable, other state transitions having a counter status that is likewise high but still below the limit value are given greater consideration in terms of adaptation, because of a higher weighting. This will be explained again in further detail later on, in conjunction with the exemplifying embodiment.

According to an embodiment of the present invention, an automated interaction system is implemented using hardware and software components. It includes, in this context, a control and processing unit having an arrangement for input recognition and an evaluation arrangement for evaluating inputs, one or more memories, input and output arrangements for accepting user or administrator inputs and for outputting system communications and prompts. The output arrangements can be of a visual and/or acoustic and/or tactile type. Appropriate input arrangements, in consideration of multimode input methods, are microphones for speech instructions of users, as well as keyboards, touch-sensitive screens, pointing devices in the form of a computer mouse or arrangement comparable therewith, styli, and inclination or motion sensors. A further constituent of the interaction system is a user class manager held in its memory or memories.

According to an embodiment of the present invention, the corresponding interaction system furthermore possesses a plurality of counters likewise held in the memory or memories, which counters are allocated in user-class-related fashion to system transitions of interactions implemented in the system; and further possesses a control mechanism, stored in the memory or memories, for evaluating the counters and for user-class-selective adaptation of interactions by the control and processing unit based on application of the corresponding rules. The system can be expanded to include hardware- and software-based arrangements for speech recognition, handwriting recognition, and/or emotion recognition.

FIG. 1a shows an example of an interaction model in which the interaction states, i.e. messages, prompts, and menu options, and the relationships existing between them via state transitions, are depicted in a tree structure. The circles labeled with state numbers identify individual interaction states, and the arrows connecting them identify the state transitions; a corresponding circle generally identifies a more complex interaction state that, is optionally made up of a plurality of states (such as prompts or sub-prompts) directly linked to one another.

Figure 1B:
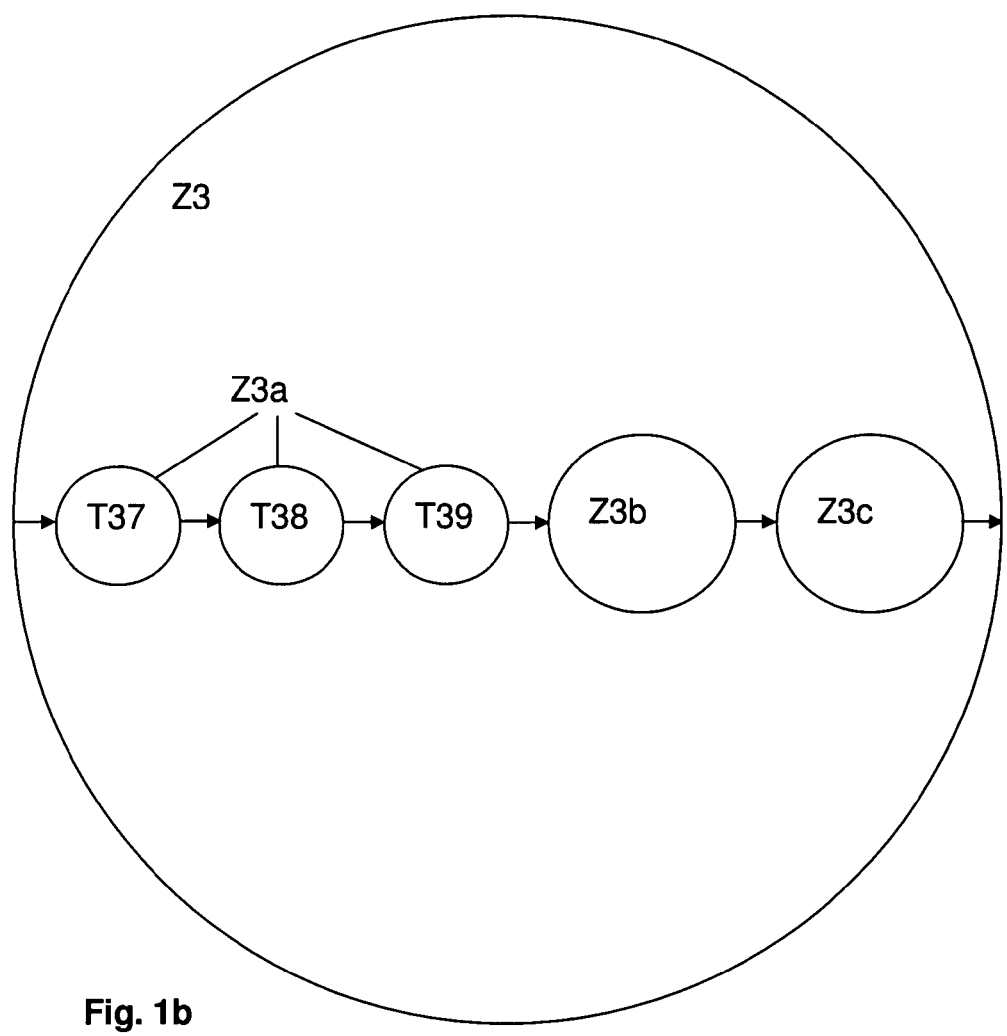

FIG. 1b depicts state Z3 of the interaction model according to FIG. 1a again, in more detail. In accordance therewith, state Z3 involves a system prompt and its associated evaluation in terms of subsequent possible branchings or state transitions of the interaction. Let it be assumed in this context that the complex state Z3 encompasses a prompt element Z3a having multiple sub-prompts T37, T38, T39; a state Z3b in which, after the output of sub-prompts T37, T38, T39, execution waits for a corresponding input by a person conducting the interaction with the system; and an evaluation state Z3c for the relevant inputs. As is apparent, according to the example the complex state Z3, which is to be regarded in its entirety as a prompt with associated evaluation, encompasses three sub-prompts T37, T38, T39. At a specific point in time that is considered first, these sub-prompts T37, T38, T39 are outputted by the system, in the sequence T37, T38, T39, as the complex state Z3 is executed. As a result, a person conducting the interaction is requested to select between the subsequent possible options Z7, Z8, and Z9. The state transitions, which each represent a transition, occurring on the basis of the selection respectively made by the person conducting the interaction, to one of the aforesaid options following state Z3, are labeled $w_{0307}$, $w_{0308}$, and $w_{0309}$ in FIG. 1a.

Let it now be assumed that for the aforementioned state transitions, user-class-specific utilization counters are operated in the interaction system in accordance with a basic principle of the present invention. Let it further be assumed that the corresponding counters in the interaction system are provided with a weighting, state transition $w_{0307}$ having a weighting of 2, state transition $w_{0308}$ a weighting of 3.5, and state transition $w_{0309}$ a weighting of 5.5. The corresponding weighting coefficients are calculated according to the following equation:

$$w_{ij} = C_{ij} + t_n + g_K \times \sum_{m=1}^{n}(t_n - t_m),$$

where
$W_{ij}$=weighting factor for the interaction transition I→j,
$t_n$=time from beginning of the prompt to playback of the last sub-prompt that is heard,
$t_m$=time from beginning of the prompt to playback of the m-th sub-prompt,
$g_K$=a memory factor reflecting the memory effort by the member of a user class,
C=an optionally stipulated constant,
and where n, starting at 1, is the index of the respective most recently heard sub-prompt, and is different for each $W_{ij}$.

If a limit value of 999 is then stipulated for the sum of the counters respectively associated with the aforesaid state transitions, with reference to a very specific user class A, and if that limit value is exceeded, an adaptation of the interaction is performed with respect to that user class A. Let it be assumed here that proceeding from state Z3, option 7 was selected 190 times, option 8 410 times, and option 9 400 times by the users of the corresponding user class. The purpose of the adaptation of the interaction that now begins is, for example, to arrange the sub-prompts that inform the users of the corresponding subsequent options in a different sequence corresponding to their identified relevance, in consideration of the transitions that were identified. If the weighting of the state transitions were left out of consideration here, and if prompts T37, T38, T39 were re-ordered exclusively on the basis of the counter values, sub-prompts T37, T38, T39 would need, unlike in FIG. 1b, to be arranged in the sequence T38, T39, T37. A consideration of the stipulated weighting, however, results in a different adaptation scenario, in which the sub-prompts are arranged in the sequence T39, T38, T37.

Figure 2A:
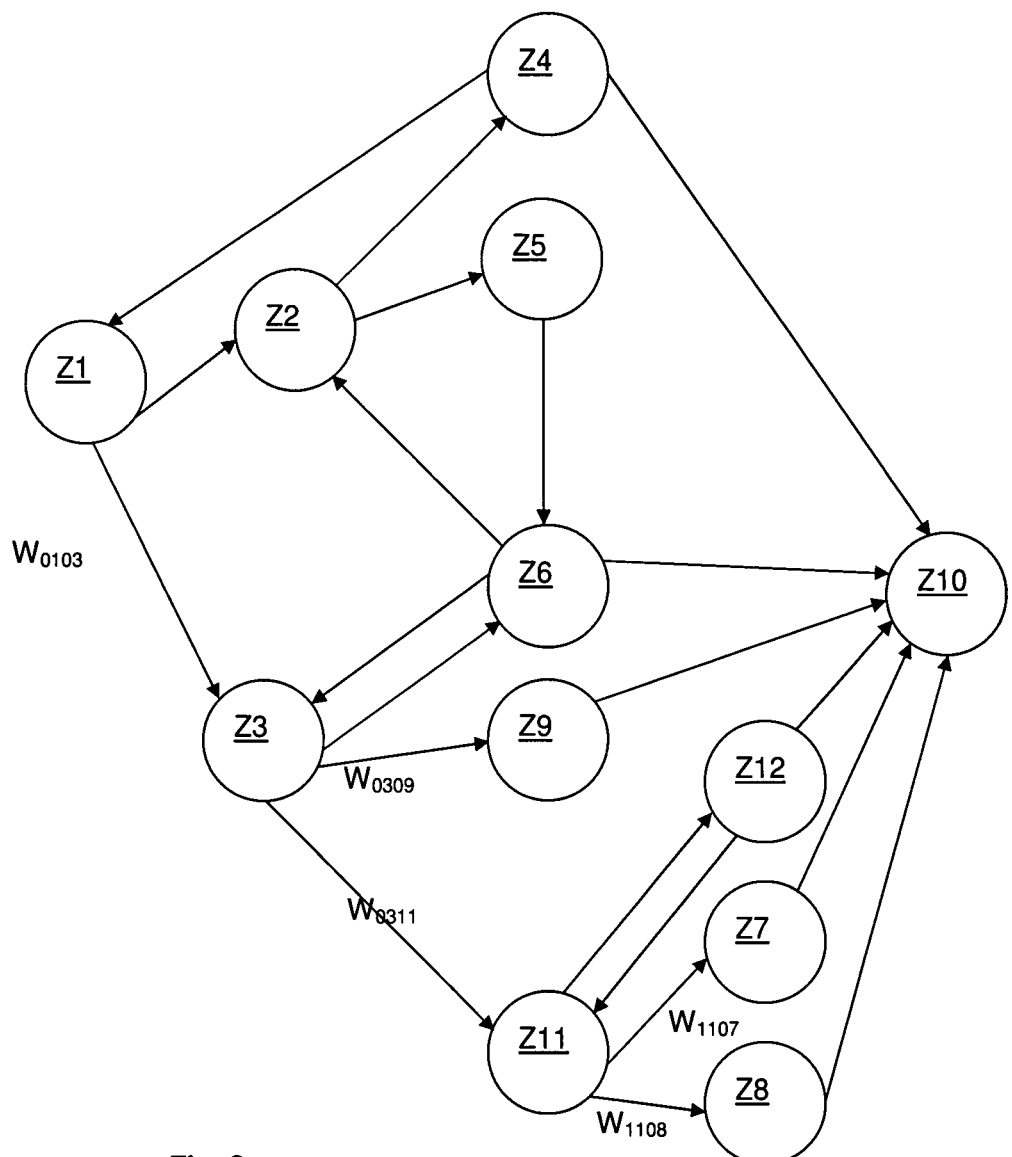
FIG. 2a is a diagram showing the interaction model according to FIG. 1a after a user-class-related adaptation.
Figure 2B:
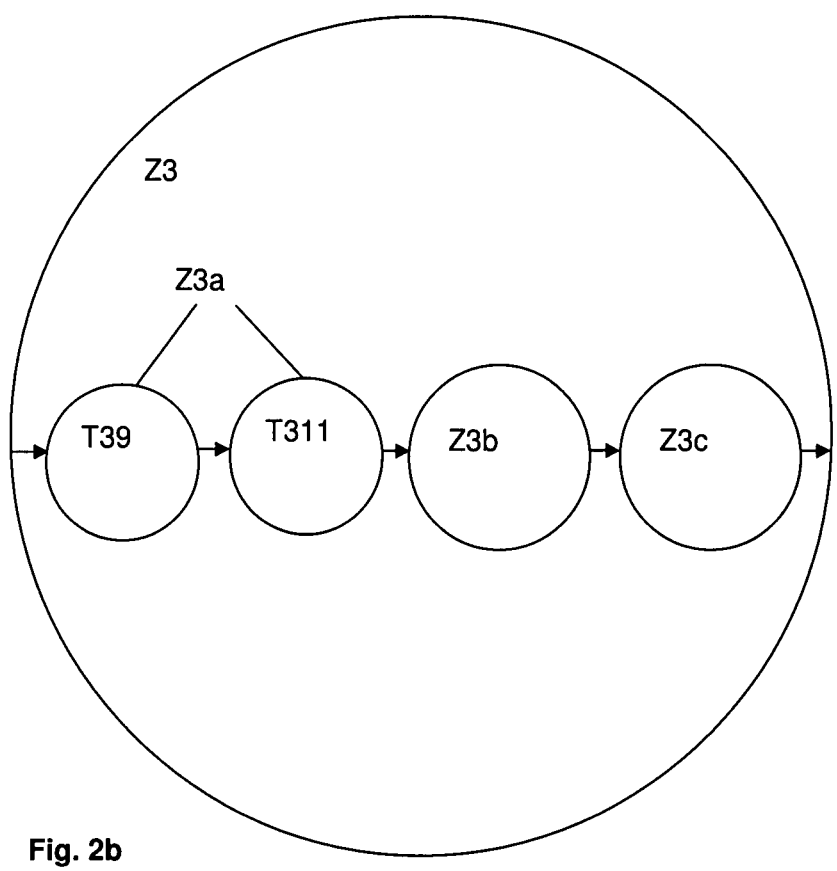

Referred to the example explained above, however, it is also possible not simply to reorganize sub-prompts T37, T38, T39 of the complex state or prompt Z3 in terms of their sequence, but to make a change in the logical sequence of the states or menu items that follow state Z3. This possibility is illustrated by FIGS. 2a and 2b, which show an example of a modification of the interaction depicted in FIGS. 1a and 1b. According thereto, the interaction is modified, based on the previously considered counter values for the status transitions, in such a way that in the interaction relevant to the interaction states following state Z3, the menu width is reduced and the menu depth is increased. For this purpose, a new, additional menu item Z11 having associated state transitions $w_{1107}$ and $w_{1108}$ is inserted between state Z3 and states Z7 and Z8. According to FIG. 2b, only two sub-prompts T39, T311 are now outputted in state Z3, specifically firstly a sub-prompt T39 that refers to menu option or state Z9, and after that a sub-prompt T311 that refers to state Z11 and, by way thereof, to states Z7 and Z8.

Be it noted once again that multiple counters are operated for the individual state transitions under consideration, since the state transitions are always counted in user-class-related fashion. This does not, however, preclude operating, for one or more status transitions, a shared counter for two or more user classes. In any event, however, the adaptation explained above is also always performed in user-class-related fashion. This means that an entirely different adaptation of the interaction might result with regard to a user class other than user class A considered above, i.e. for example for a user class B, for example as a result of different weightings.

The regrouping of individual interaction options into different menu branches or levels is not always advisable, since menu options should constitute a unit in terms of their meaningful contents. Additional information can therefore be contained in data structures (e.g. according to FIG. 1a or FIG. 2a) and/or in memory regions of the interaction system that are assigned directly to an interaction state, which information acts in some circumstances as an adaptation block with regard to other menu options and/or interaction states. On the other hand, explicitly permitted combination possibilities, or references thereto, can be also be contained in other data structures. Ontologies can furthermore be used for hierarchical description of possible combinations of meaning-related information elements.

Figure 3A:
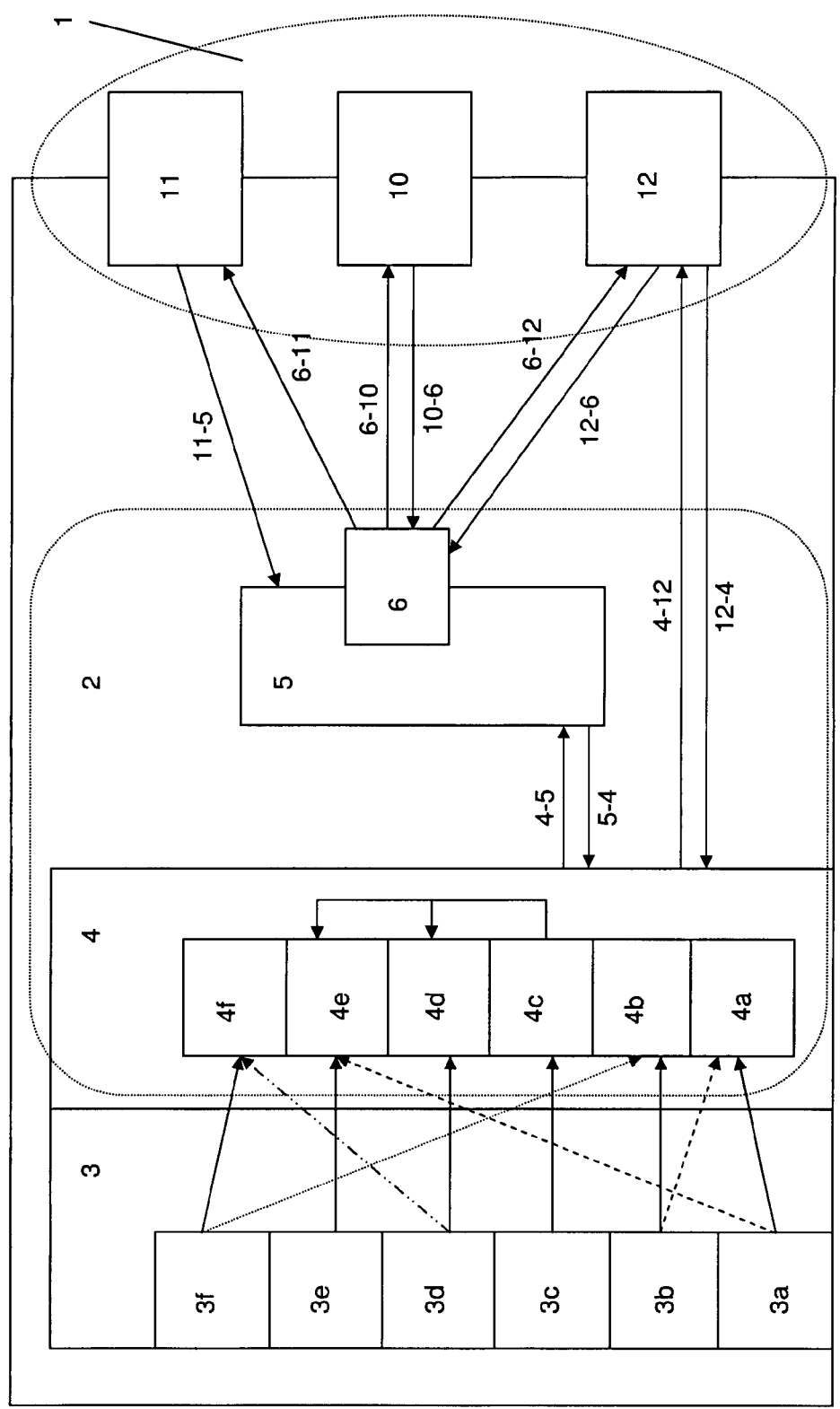
FIG. 3a is a schematic depiction of part of a structure of an automated speech interaction system according to an example embodiment of the present invention.
Figure 3B:
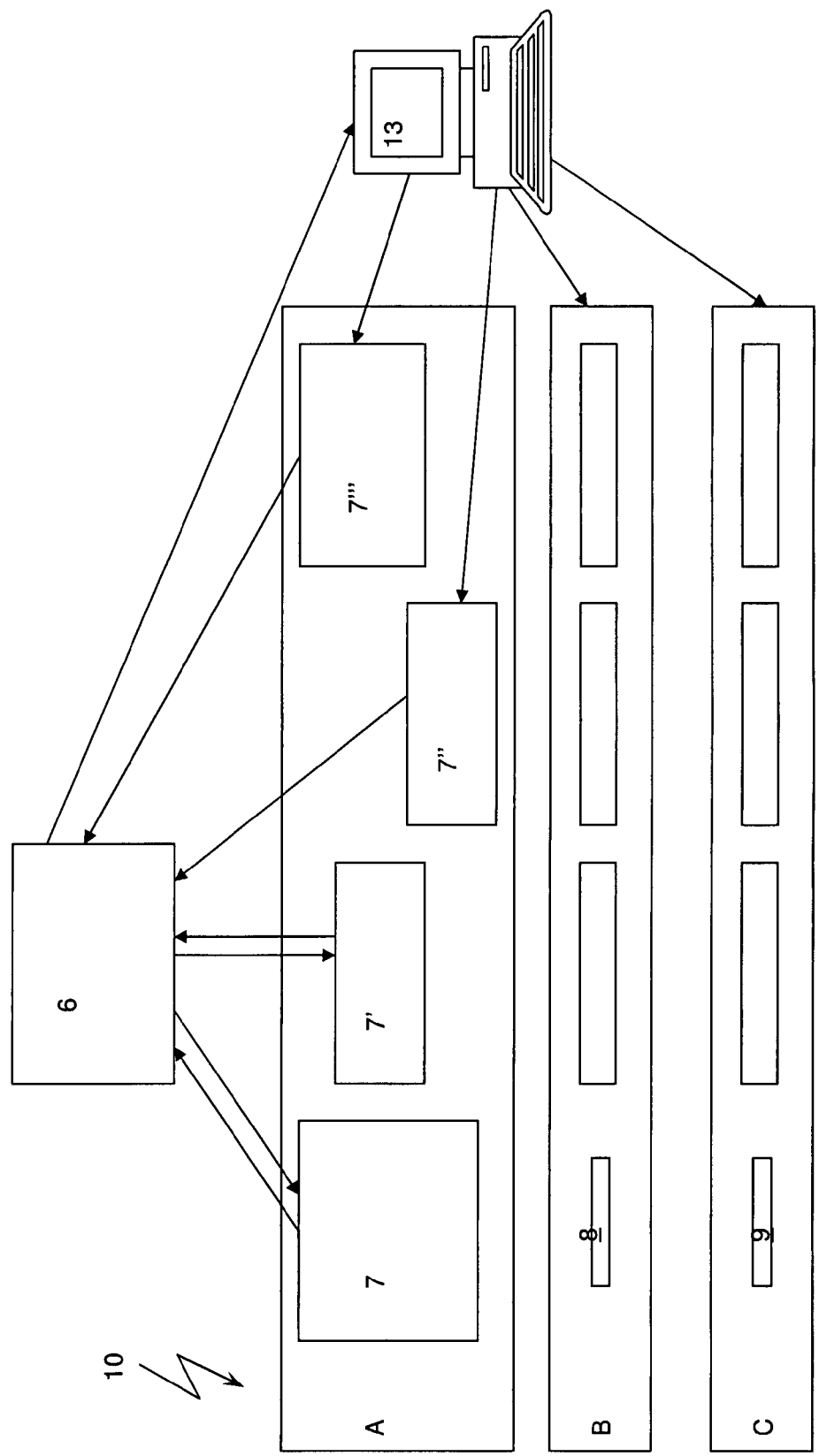

Sub-structures of an interaction system suitable for carrying out the method are schematically depicted, by way of example, in FIGS. 3a and 3b. The example shown in FIG. 3a refers to a sub-structure of a speech interaction system. Possible input and output arrangements such as a microphone, keyboard, mouse, and loudspeaker, display/monitor (see, for example FIG. 3b for monitor 13), and the like were not depicted in FIG. 3a. In addition to these input and output arrangements that are not shown, the speech interaction system that is depicted encompasses arrangement 3 for input recognition, in the present case arrangement 3e for emotion recognition, arrangement 3d for speaker identification, arrangement 3c for speaker classification, arrangement 3b for language identification or language classification, and arrangement 3a for speech recognition and/or for dial-tone or DTMF tone recognition. In the exemplifying embodiment depicted, arrangement 3 for input recognition also comprise arrangement 3f for identifying a connection/terminal identifier (e.g., as already mentioned, CLI, HLR, IP address). The aforesaid input recognition arrangements coact in complex fashion, as should be evident from the large number of arrows extending between the components, with associated evaluation arrangement 4. The latter are part of a control and processing unit 1 and encompass arrangement 4f for recognizing a user identifier, arrangement 4e for identifying emotional states, arrangement 4d for identifying a speaker, arrangement 4c for identifying a speaker class, arrangement 4b for identifying a language being spoken, and arrangement 4a for evaluating speech inputs, having e.g. deterministic and/or statistical grammars for so-called natural language understanding. Connected to the system level just explained, as part of control and processing unit 1, is an interaction/application manager 5. The latter encompasses a function module 6 for exchanging application-specific data 11, user-class-specific data 10, and user-specific data 12, which data are held in corresponding memory regions 2 of the system. The application-specific data 11 can be specific message texts to be reproduced; information to be outputted, e.g. regarding availability time periods of the system; or telephone numbers, addresses, or the like of the application supplier or of the system operator.

FIG. 3b provides an example of a structure for user-class-specific data 10. Class-specific counters 7, 8, 9 (in the example, for classes A to C) for transitions between interaction states, optionally for values 7' derived from said counters, for respective time periods 7" to be considered, and for limit values 7''', and rules for counters and/or values derived therefrom, are managed and, if applicable or necessary, administered in this context.

Figure 4:
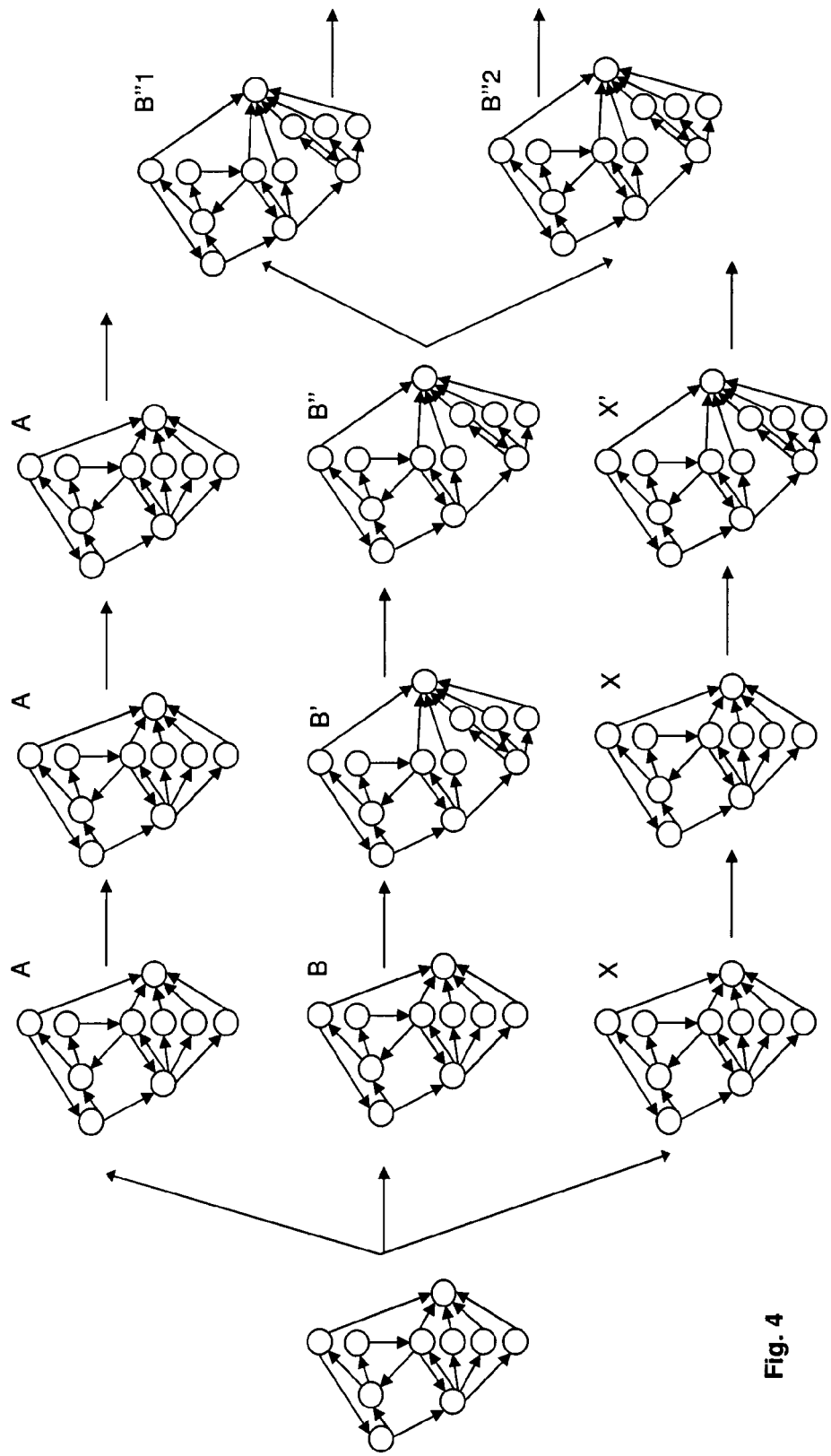
FIG. 4 is a schematic depiction of an example of a development of class-specific interaction structures according to an example embodiment of the present invention.

FIG. 4 shows, by way of example, the development of class-specific interaction structures. The example proceeds from an initial basic interaction structure that is nevertheless already, at system startup, diversified for different user classes into a variety of initial interaction structures. It is apparent from the depiction that the interaction structure for class B, proceeding from the associated initial interaction structure, is first modified in accordance with the rules stored in the system, i.e. is adapted to presumed needs of the persons of user class B, i.e. is converted into B'. An adaptation of the interaction structure of class X is performed only at a later point in time, while within the time period under consideration, an adaptation of the interaction structure with respect to the needs of users belonging to class A is not necessary. It is additionally apparent that after operation of the interaction system for a certain period of time, a new user class is created by the interaction system on the basis of previous adaptations of the interaction for class B, and corresponding rules held in the system. The users originally allocated to user class B are thereafter divided into a user class B1 and a user class B2 having the interaction natures or structures B"1 and B"2. The nature of the interaction or the interaction structure at the time of this division is then construed, in the context of the previous explanations, as an initial interaction structure of class B1 and class B2. Interactions or sub-interactions that are structured in different class-specific ways can be achieved not only by using different memory regions 2, i.e. by storing a plurality of possible different interaction structures. Also possible is a corresponding class-specific parameterization, if applicable also stored in the form of a tree structure, for an interaction and/or sub-interaction that is stored in an individual memory region and is then processed differently depending on parameterization (e.g. class-specific branchings, queries or information outputs or prompts, class-specific prompt speeds, interaction strategies, persona design or speaker, prompt style).

As already stated, limit values (for counters, groups of counters, or variables derived from the counters) can be defined that, when exceeded or fallen below, result in a user-class-specific adaptation of the interaction. The counters, counter groups, and derived variables, as well as their associated limit values, can be stored in association with the state transitions and the respective user classes, preferably in a multidimensional matrix. Further possible variables derived from the utilization counters or groups of counters will be indicated at this juncture by way of example. The following such derived variables are possible:

a) Counter changes within defined time periods, or the counting speed ($\Delta Z/\Delta t$). These values usually represent, for specific interactions, short-term, spontaneous changes in the behavior of a user and/or in the user behavior in at least one class, e.g. as a consequence of sporting events.

b) The product of the mean of two counter values that delimit a predefined time period times the duration of that time period $[(Z_1+Z_2)/2] \Delta t$, or the integral of the count function that is determined, which represents the counter value at a defined point in time. Instead of evaluating the counting speed, the values cited here can also be used to assess the need to adapt the interaction, for example, for a user class. As compared with the counting speed, these values are likely to result in a softer evaluation of counter changes, i.e. spontaneous reactions have less impact here.

c) Functional combinations of multiple counter values and/or various transition values, for example the sum of multiple counters and/or other derivatives, e.g. the sum of the number of transitions from interaction state Z3 to interaction states Z7, Z8, Z9 (as shown in FIG. 1a), or the difference between the number of transitions from interaction state Z1 to interaction state Z3 and the number of transitions from interaction state Z3 to interaction state Z6. The types of functional combination are represented by a portion of the rules. The aforesaid combinations can therefore once again be a constituent of the rules.

d) Correlation factors and/or covariance values and/or values representing these parameters between and/or in series of values (e.g. counter values and/or other derivatives thereof) that are sensed in the system. If, for example, the transitions from a menu item to at least one state resulting therefrom correlate very highly with a transition from another menu item to at least one other state, it can then be recommended that the different menu items for the corresponding options be automatically and/or administratively combined into one menu item. Administratively performed changes in the interaction structure can also be performed semi-automatically after an indication of automatically calculated possible changes and, if applicable, administrative corrections.
e) Sums or other functional correlations of the efforts for at least one user class for at least one interaction transition.
f) Probability values that have been calculated from a large number of counter values and that represent, for example, transition probabilities.

As may be inferred from the context of all the foregoing statements, changes in the nature of the interaction refer not only, as shown in the examples, to the sequence and content of messages or menu options, but also to their mode of appearance. This relates, for example, to the layout of a display of messages and prompts being outputted, to the prompt style or, with regard to acoustic outputs of the interaction system, not only to the language but possibly also to the speaker type (e.g. male or female). The change in the mode of appearance of an interaction can, for example, also involve changes in speaking speed or even a change in time sequence, i.e. the rate at which messages, prompts, or menu items follow one another.

Different sociocultural backgrounds of various user classes can also govern the use of different expression styles in order to present identical sets of facts; in other words, in one user class it is in some circumstances not usual to use certain expression styles that are originally contained or additionally provided in the grammar of a speech processing and output unit. Similarly to the provisions for optimizing interaction structures, counters and limit values are now also introduced, corresponding to grammatical rules and/or words of a vocabulary that are provided for optimization. For example, multiple expression styles, sequences of expressions, and therefore also words (e.g. synonyms), and/or grammatical rules that express the same set of facts or user request can correspond to one menu option. In the same way that counters having corresponding limit values and, if applicable, corresponding derivatives are introduced for various branches of, for example, menu options, such parameters can also be allocated to individual expression styles of a set of facts (e.g. synonyms for the same menu option) in a grammar control mechanism. The frequency with which specific expression styles are used for a set of facts can be determined in class-specific and/or user-specific fashion by the application and/or the speech recognition algorithm over a defined time period $\Delta t$. The counter for an expression style is incremented either when the expression style has been identified with a high level of certainty or when, during application, the expression style identified with moderate certainty is returned by the interaction system and the user positively confirms it in interaction with the system. By analogy with optimization of the interaction structure, when a limit value for the sum of all counters of different expression styles for a menu option is reached, the grammatical rules can then also be optimized. This can be done, for example, by calculating, from the ratio of the utilization frequency of individual expression styles or sequences of expression styles (and the corresponding grammatical rules) to the sum of the utilization frequencies of all expression styles for the same set of facts (e.g. a menu option), parameters that reflect the utilization probability of the expression styles (sequences of expression styles, grammatical rules). These calculated probabilities can then be allocated to the corresponding grammatical rules in a grammar of a speech processing system; this additionally results, in the context of the class-specific adaptation of speech interactions, in a class-specific optimization of the recognition rate of the speech detector for the expressions whose grammatical rules were adapted. Another possibility for class-specific optimization of grammatical rules can also be that, when a different class-specific value for the aforesaid calculated parameter of an expression style reaches or falls below a limit value, corresponding grammatical rules are completely deleted from the overall grammar, which would correspond to allocating a probability of 0.0 (zero) to the identified grammatical rule.

A plurality of further possibilities are possible, and the possibilities recited above are therefore merely selected examples.

What is claimed is:

1. A method for adapting interactions conducted between interaction systems and users of the interaction systems to the users, comprising the steps of:

defining a nature of a respective automated interaction by interaction states in the form of messages and prompts, by the configuration of the messages and prompts, by menu options and by state transitions; and adapting the nature of the interaction, during its execution, to the user in a manner that is determined by a user class that is allocated, to the user conducting the interaction according to rules stored and implemented in the interaction system on the basis of properties communicated by the user during the interaction or automatically ascertained by the interaction system or the user's behavior, or on the basis of the user's identification by the system and information previously acquired with regard to the user's identity, wherein a manner in which the nature of the interaction is adapted to the user of a user class is modifiable, wherein user-class-specific utilization counters for selected state transitions of a system-side part of the interaction are operated in the interaction system and are incremented or decremented upon passage through respective state transitions during processing of the interaction and when a respective counter, a group of counters or a variable derived from the counters, exceeds or falls short of an established limit value, an adaptation process is started with which the nature of the system-side part of the interaction is modified in user-class-related fashion, so that proceeding from an initial nature existing upon its implementation in the system, the system-side part of the interaction is repeatedly adapted in user-class-selective fashion to the needs of the members of the respective user class, and wherein the user of the interaction system is allocated to one user class in terms of execution of the interaction that the user is presently conducting, wherein for the purpose of repeated modification of the manner in which the interaction is adapted during execution to persons of a user class, the user is allocated, as necessary, simultaneously to multiple user classes such that, during execution of the interaction, the nature of the interaction is repeatedly modified based on contemporaneous online interactions of a plurality of users of the multiple user classes.

2. The method according to claim 1 wherein a logical sequence of the state transitions determines a menu width and depth.

3. The method according to claim 1, wherein the user is allocated to only one user class in terms of execution of the interaction currently being conducted by the user, and is allocated, as necessary, to varying user classes in the course of the interaction.

4. The method according to claim 1, wherein user classes are also formed by combining other user classes that continue to be independently managed by the interaction system.

5. The method according to claim 1, wherein new user classes are formed automatically by the interaction system according to rules stored therein.

6. The method according to claim 1, wherein the interaction is implemented, for various user classes that are established or managed in the interaction system at the time of its implementation, using different user-class-specific initial natures.

7. The method according to claim 1, wherein the interaction is adapted in terms of its nature being embodied, at least partially, as a speech interaction, at least with regard to the user-side part of the interaction, allocation of the user to user classes of the interaction system accomplished on the basis of the language spoken by the user and detected by an arrangement for language identification.

8. The method according to claim 7, wherein allocation of the user to user classes of the interaction system is accomplished according to rules stored in the interaction system, by evaluating data automatically acquired by an arrangement for speech recognition.

9. The method according to claim 7, wherein allocation of the user to user classes of the interaction system is accomplished on the basis of an accent, dialect, or sociolect spoken by the user and identified by an arrangement for speaker classification.

10. The method according to claim 7, wherein allocation of the user to user classes of the interaction system is accomplished on the basis of the user's age, determined with reference to the speech by the arrangement for speaker classification.

11. The method according to claim 1, wherein the interaction is adapted in terms of its nature being embodied at least partially as a speech interaction at least with regard to the user-side part of the interaction, allocation of the user to user classes of the interaction system accomplished on the basis of the user's gender, determined with reference to the speech by the arrangement for speaker classification.

12. The method according to claim 1, wherein allocation of the user to user classes of the interaction system is accomplished automatically according to rules stored in the interaction system, by evaluating data automatically acquired by an arrangement for emotion detection.

13. The method according to claim 1, wherein at least one of properties and behaviors of the user are automatically ascertained by the interaction system and are linked to confidence values, and at least one of corresponding properties and behaviors are not taken into consideration in the event of an insufficient confidence for allocation of the user to user classes of the interaction system.

14. The method according to claim 1, wherein data used for allocation of the user to user classes of the interaction system includes properties or behaviors ascertained, or information previously acquired, with regard to the user's identity, wherein the data used for allocation of the user to user classes is weighted so that individual items of the data take priority over others upon classification of the user in terms of the user's allocation to user classes of the interaction system.

15. The method according to claim 14, wherein confidence values linked to the data used to classify the user affect the weight of the corresponding data.

16. The method according to claim 1, wherein the counters for the selected state transitions are weighted so that the respective counter values of the counters affect a user-class-related modification of the nature of the interaction with different weights.

17. The method according to claim 1, wherein allocation of the user to user classes of the interaction system is accomplished by combining at least one of properties and behaviors known or ascertained about the user with at least one of time-related, local, and technical parameters.

18. An automated interaction system, comprising:
at least one control and processing unit configured to adapt interactions conducted between an interaction system and users of the interaction system to the users, wherein a nature of a respective automated interaction is defined by interaction states in the form of messages and prompts, by the configuration of said messages and prompts, by menu options and by state transitions, wherein the nature of the interaction is adapted, during its execution, to the user in a manner that is determined by a user class that is allocated to the user conducting the interaction according to rules stored and implemented in the interaction system on the basis of properties communicated by the user during the interaction or automatically ascertained by the interaction system or the user's behavior, or on the basis of the user's identification by the system and information previously acquired with regard to the user's identity, wherein the manner in which the nature of the interaction is adapted to the user of a user class is modifiable, wherein user-class-specific utilization counters for selected state transitions of a system-side part of the interaction are operated in the interaction system and are incremented or decremented upon passage through respective state transitions during processing of the interaction and when a respective counter, a group of counters or a variable derived from the counters, exceeds or falls short of an established limit value, an adaptation process is started with which the nature of the system-side part of the interaction is modified in user-class-related fashion, so that proceeding from an initial nature existing upon its implementation in the system, the system-side part of the interaction is repeatedly adapted in user-class-selective fashion to the needs of the members of the respective user class,
the control and processing unit including an input recognition device and an input evaluation device, at least one memory, an input device configured for interactive inputs of a user and inputs of an administrator, and an output device configured for outputting system communications and prompts, data held in the at least one memory of the interaction system including a user class manager,
wherein the control and processing unit is configured to manage the user-class-specific utilization counters for selected state transitions of the system-side part of the interactions imaged in the interaction system and the control and processing unit manages a control mechanism according to which, when values allocated to the counters, to a group of counters, or to variables derived therefrom exceed or fall below limit values, the system-side part of the interaction, proceeding from an initial nature existing upon its implementation in the system, is repeatedly adapted in user-class-selected fashion to needs of the members of a respective user class using a software program processed by the control and processing unit, without additional administrative interventions, and
wherein the control and processing unit is further configured to allocate the user of the interaction system to one user class in terms of execution of the interaction that the user is presently conducting and, for the purpose of repeated modification of the manner in which the interaction is adapted during execution to persons of a user class, the user is allocated, as necessary, simultaneously to multiple user classes such that, during execution of the interaction, the nature of the interaction is repeatedly modified based on contemporaneous online interactions of a plurality of users of the multiple user classes.

19. The interaction system according to claim 18 wherein the transitions between the interaction states and the transitions logical sequence determine a menu width and depth.

20. The interaction system according to claim 18, further comprising a language unit configured to provide language identification.

21. The interaction system according to claim 18, further comprising a speech recognition and evaluation unit.

22. The interaction system according to claim 18, further comprising:
   a speaker unit configured to provide at least one of speaker identification and speaker classification; and
   an evaluation unit associated with the speaker unit.

23. The interaction system according to claim 18, further comprising a handwriting recognition unit.

24. The interaction system according to claim 18, further comprising an emotion recognition and evaluation unit.

* * * * *